US 12,066,284 B2

United States Patent
Sugawara

(10) Patent No.: US 12,066,284 B2
(45) Date of Patent: Aug. 20, 2024

(54) IMAGE PROJECTION MEASURING APPARATUS

(71) Applicant: SUBARU CORPORATION, Tokyo (JP)

(72) Inventor: Takatoshi Sugawara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 299 days.

(21) Appl. No.: 17/521,619

(22) Filed: Nov. 8, 2021

(65) Prior Publication Data

US 2023/0145960 A1 May 11, 2023

(30) Foreign Application Priority Data

Dec. 10, 2020 (JP) .................................. 2020-204911

(51) Int. Cl.
*G01B 11/25* (2006.01)
*H04N 23/90* (2023.01)

(52) U.S. Cl.
CPC ......... *G01B 11/2545* (2013.01); *H04N 23/90* (2023.01)

(58) Field of Classification Search
CPC ............................ G01B 11/2545; H04N 23/90
USPC ....................................................... 702/127
See application file for complete search history.

(56) References Cited

U.S. PATENT DOCUMENTS

| 9,052,294 B2 * | 6/2015 | Walton .............. G01N 21/8806 |
| 2005/0041852 A1 * | 2/2005 | Schwarz ............. B23K 26/032 |
| | | 382/152 |
| 2013/0293684 A1 * | 11/2013 | Becker .............. G01B 11/2545 |
| | | 348/47 |
| 2014/0168379 A1 | 6/2014 | Heidemann et al. |
| 2015/0159987 A1 | 6/2015 | Abe |
| 2016/0091311 A1 * | 3/2016 | Rueb ................... G01C 15/002 |
| | | 348/94 |

(Continued)

FOREIGN PATENT DOCUMENTS

| JP | 2005293291 A | 10/2005 |
| JP | 2015-114170 A | 6/2015 |

(Continued)

OTHER PUBLICATIONS

Japanese Office Action, dated May 28, 2024 in Japanese Application No. 2020-204911 and English Translation Thereof.

*Primary Examiner* — Ricky Go
(74) *Attorney, Agent, or Firm* — MCGINN I.P. LAW GROUP, PLLC

(57) ABSTRACT

An image projection measuring apparatus includes a measurer, a storage, an image projection data generator, an image projector, and an image projection controller. The measurer is configured to measure a shape of a work by illuminating an outer surface of the work with a line laser from a laser emitter. The storage is configured to store measurement data acquired by the measurer. The image projection data generator is configured to generate image projection data from the measurement data. The image projector includes a camera and is configured to project the image projection data from the camera. The image projection controller is configured to cause the image projector to project the image projection data onto the outer surface of the work.

18 Claims, 7 Drawing Sheets

(56) References Cited

U.S. PATENT DOCUMENTS

2017/0193673 A1  7/2017  Heidemann et al.
2020/0318950 A1  10/2020  Nakagawa et al.

FOREIGN PATENT DOCUMENTS

JP  2015-537228 A  12/2015
WO  2019-087726 A1  9/2019

* cited by examiner

IMAGE PROJECTION MEASURING APPARATUS

CROSS-REFERENCE TO RELATED APPLICATIONS

The present application claims priority from Japanese Patent Application No. 2020-204911 filed on Dec. 10, 2020, the entire contents of which are hereby incorporated by reference.

BACKGROUND

The disclosure relates to an image projection measuring apparatus and particularly relates to an image projection measuring apparatus that improves working efficiency by projecting image projection data obtained through conversion onto a work to enable checking of the measurement precision while acquiring measurement data of the work on the measurement site.

Japanese Unexamined Patent Application Publication No. 2015-114170 discloses a three-dimensional measuring apparatus of related art. The three-dimensional measuring apparatus primarily includes a probe used to measure a work, and an articulated arm mechanism with the probe at the distal end thereof. The three-dimensional measuring apparatus is coupled to, for example, a notebook personal computer (hereinafter referred to as a "personal computer") and causes a display of the personal computer to display image data to which measurement data is converted. An operator checks the image data displayed on the display of the personal computer and compares it with an actual work to determine whether the measuring operation is being performed with good precision.

SUMMARY

An aspect of the disclosure provides an image projection measuring apparatus including a measurer, a storage, an image projection data generator, an image projector, and an image projection controller. The measurer is configured to measure a shape of a work by illuminating an outer surface of the work with a line laser from a laser emitter. The storage is configured to store measurement data acquired by the measurer. The image projection data generator is configured to generate image projection data from the measurement data. The image projector includes a camera and is configured to project the image projection data from the camera. The image projection controller is configured to cause the image projector to project the image projection data onto the outer surface of the work.

An aspect of the disclosure provides an image projection measuring apparatus including a measurer, an image projector, and circuitry. The measurer is configured to measure a shape of a work by illuminating an outer surface of the work with a line laser from a laser emitter. The image projector includes a camera and is configured to project image projection data from a camera. The circuitry is configured to store measurement data acquired by the measurer. The circuitry is configured to generate the image projection data from the measurement data. The circuitry is configured to cause the image projector to project the image projection data onto the outer surface of the work.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
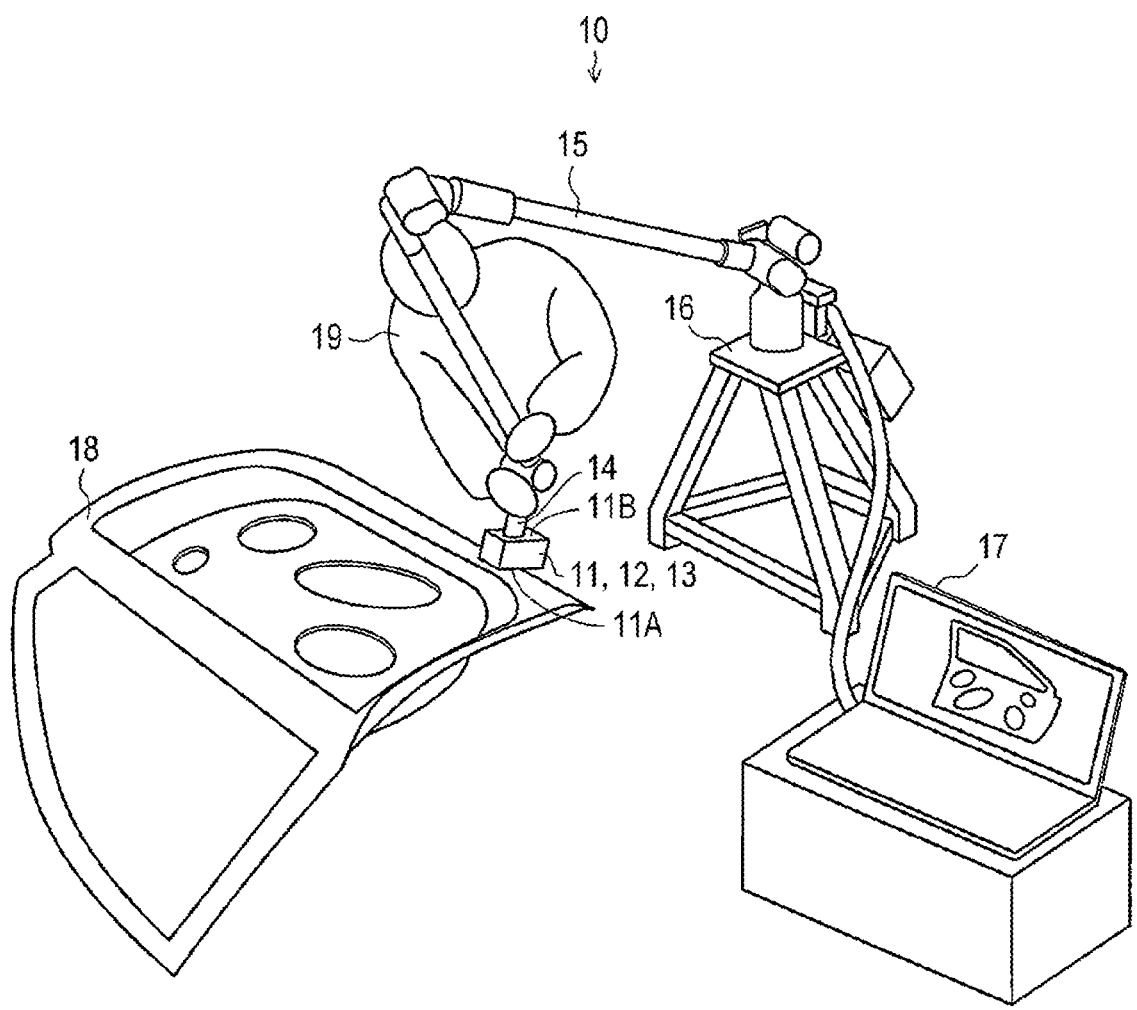
FIG. 1 is a perspective view of an image projection measuring apparatus according to an embodiment of the disclosure.

The measuring method using the three-dimensional measuring apparatus of related art described above may involve operators working in pairs. One operator brings the tip of the probe into contact with the work while operating the articulated arm mechanism to measure the shape of the work. In coordination with the operation for measuring the shape of the work, the other operator checks image data displayed on the display of the personal computer to find areas of low measurement precision and gives appropriate instructions to the one operator.

In this measuring method, the instructions described above may not be given in a timely manner, or the two operators may have different criteria for determining the precision of measurement data. The resulting failure in communication between the two operators may degrade working efficiency.

To solve the problems described above, one operator may compare the image data displayed on the display of the personal computer with the shape of the work to be measured to determine the measurement precision while performing the measuring operation on the work. To check the measurement precision during the measuring operation on the work, the operator frequently stops the ongoing measuring operation and shifts the eyes from the work to the display of the personal computer. With this measuring method, therefore, it is difficult to ensure high working efficiency.

Additionally, in the measuring method described above, where the operator determines the precision of the measurement data while checking the image data displayed on the display of the personal computer, the determination of precision of the measurement data may vary depending on, for example, the experience and skill of the operator.

The disclosure has been made in view of the circumstances described above. It is desirable to provide an image projection measuring apparatus that improves working efficiency by projecting image projection data obtained through conversion onto a work to enable checking of the measurement precision while acquiring measurement data of the work on the measurement site.

First, an image projection measuring apparatus 10 according to an embodiment of the disclosure will be described in detail on the basis of the drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 2:
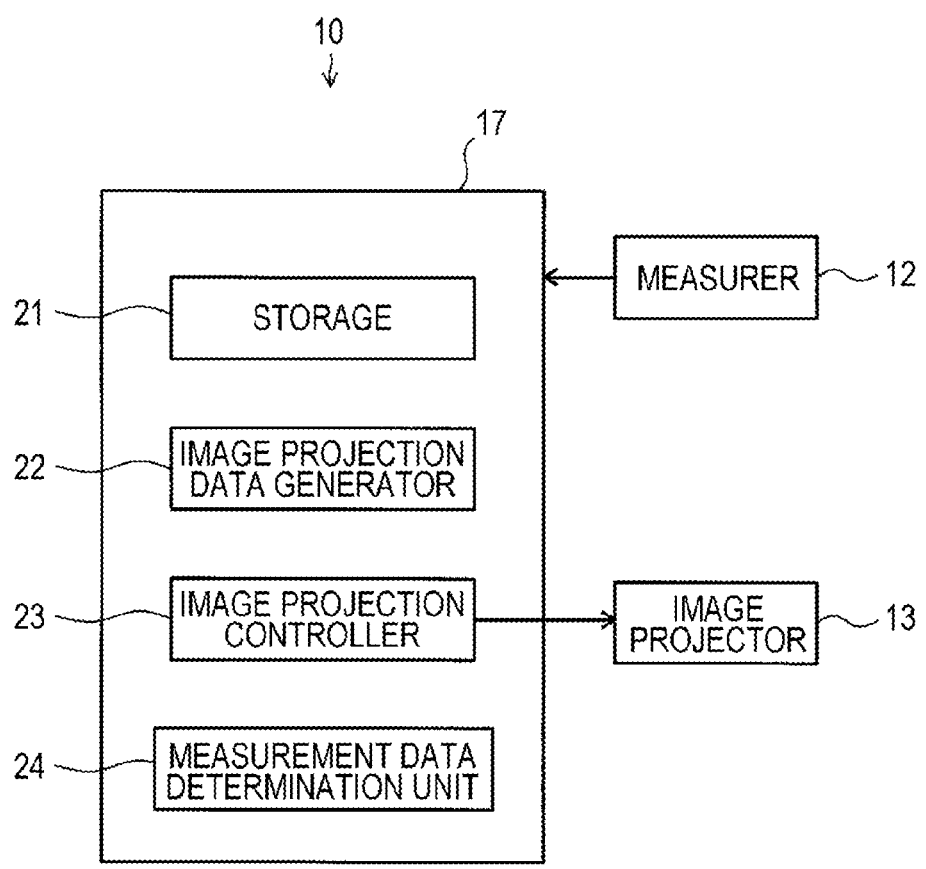
FIG. 2 is a block diagram illustrating the image projection measuring apparatus according to the embodiment of the disclosure.
Figure 3:
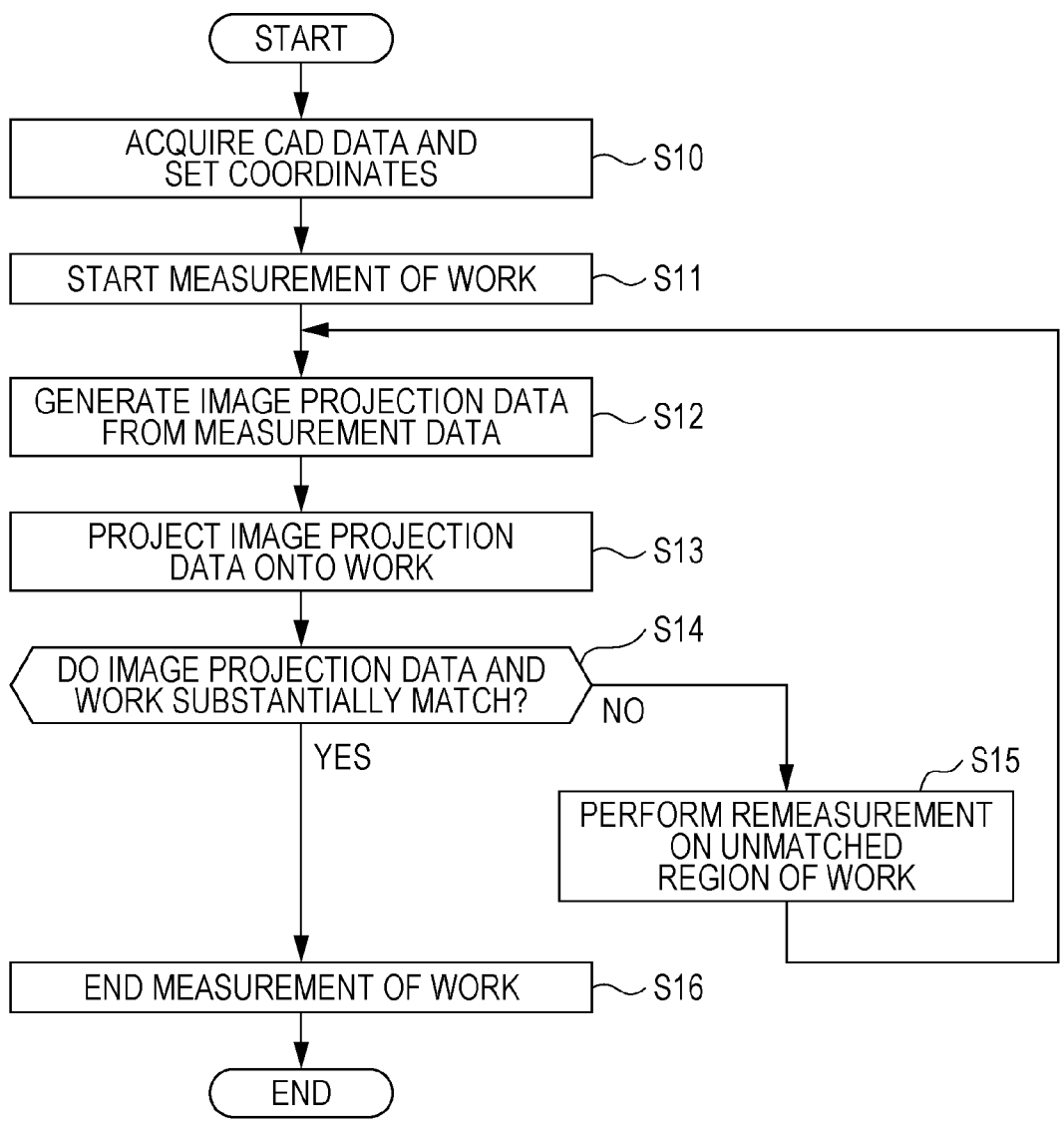
FIG. 3 is a flowchart illustrating a measuring operation performed by the image projection measuring apparatus according to the embodiment of the disclosure.
Figure 4:
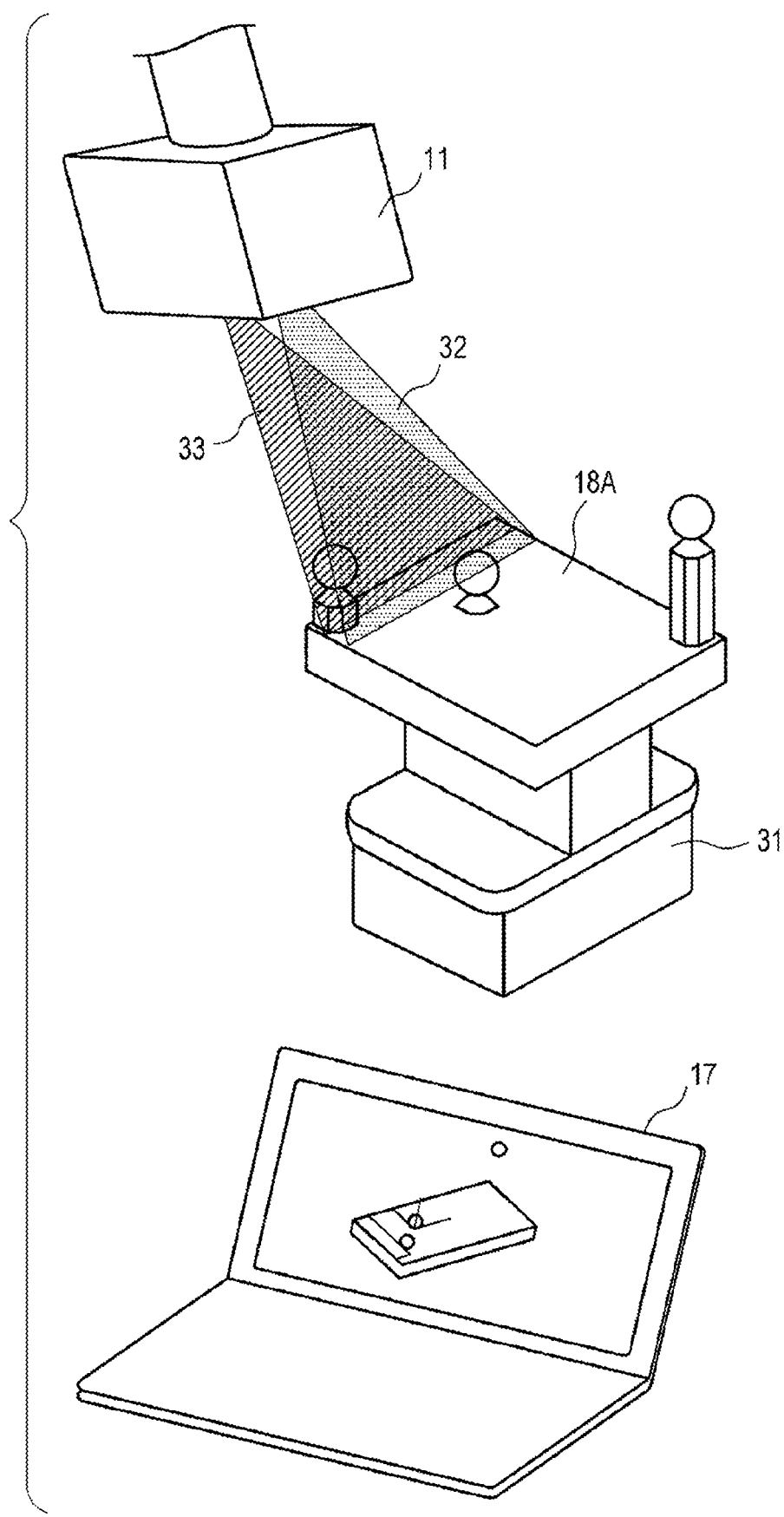
FIG. 4 schematically illustrates a measuring operation performed by the image projection measuring apparatus according to the embodiment of the disclosure.
Figure 5:
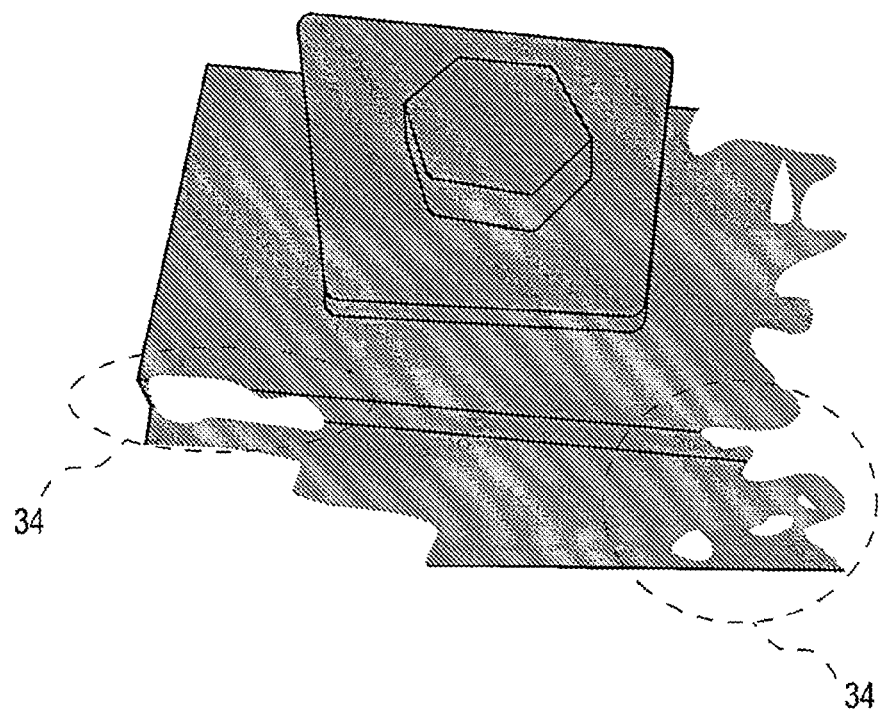
FIG. 5 schematically illustrates a measuring operation performed by the image projection measuring apparatus according to the embodiment of the disclosure.

FIG. 1 is a perspective view of the image projection measuring apparatus 10 according to the present embodiment. FIG. 2 is a block diagram illustrating the image projection measuring apparatus 10 according to the present embodiment. FIG. 3 is a flowchart illustrating a measuring operation performed on a work 18 by the image projection measuring apparatus 10 according to the present embodiment. FIG. 4 and FIG. 5 each schematically illustrate a measuring operation performed on the work 18 by the image projection measuring apparatus 10 according to the present embodiment.

As illustrated in FIG. 1, the image projection measuring apparatus 10 primarily includes a main body 11, a measurer 12 included in the main body 11, an image projector 13 included in the main body 11, a grip 14 with which to operate the main body 11, an articulated arm 15 coupled to the grip 14, a base 16 configured to support the articulated arm 15, and a controller 17 configured to control the image projection measuring apparatus 10. The image projection measuring apparatus 10 is used as a measuring apparatus that measures the shape of the work 18, such as a body panel of a vehicle. The image projection measuring apparatus 10 is also used as an image projecting apparatus that projects image projection data generated from measurement data of the work 18 using a projection mapping technique.

The main body 11 is, for example, a rectangular housing configured to include therein the measurer 12 and the image projector 13. A front surface 11A of the main body 11 has thereon a laser emitter 12A (see FIG. 6) of the measurer 12 and cameras 13A and 13B (see FIG. 7) of the image projector 13. The laser emitter 12A is configured to emit a line laser L (see FIG. 6). The cameras 13A and 13B are configured to project image projection data.

The measurer 12 is, for example, a non-contact laser scanner. The measurer 12 is capable of measuring the three-dimensional shape of the work 18 by illuminating the outer surface of the work 18 with the line laser L. An operator 19 moves the line laser L, for example, from the lower end toward the upper end of one side of the work 18 in a desired measuring direction, so that, for the area passed through by the line laser L, measurement data constituted by coordinate data is acquired with respect to each line laser L. The acquired measurement data is stored in a storage 21 (see FIG. 2).

The image projector 13 is a projector device, such as a digital light processing (DLP) projector or a liquid-crystal projector. Under the control of an image projection controller 23 (see FIG. 2), the image projector 13 projects image projection data generated by an image projection data generator 22 (see FIG. 2) onto the outer surface of the work 18. While described in detail below, image projection data is data for image projection and is obtained by converting the measurement data.

The grip 14 is coupled to a back surface 11B of the main body 11 and is also coupled to the articulated arm 15. That is, the grip 14 is disposed between the main body 11 and the articulated arm 15. To perform a measuring operation, the operator 19 holds the grip 14 and moves the front surface 11A of the main body 11, within the range of movement of the articulated arm 15, along the outer surface of the work 18 to be measured.

The articulated arm 15 is constituted, for example, by a six-axis mechanism. The articulated arm 15 is coupled at one end thereof to the grip 14 and coupled at the other end thereof to the base 16. The articulated arm 15 is movable in various directions in conjunction with movement of the grip 14. With the grip 14, the operator 19 can freely move the front surface 11A of the main body 11 along the outer surface of the work 18. The articulated arm 15 is supported in a stable state by the base 16.

The controller 17 is, for example, an electronic controller (ECU) including a central processing unit (CPU), a read-only memory (ROM), and a random-access memory (RAM) and configured to execute various computations for controlling the image projection measuring apparatus 10. As illustrated, the image projection measuring apparatus 10 is coupled to a personal computer, which is then used as the controller 17.

The storage 21 of the controller 17 illustrated in FIG. 2 is constituted, for example, by a non-volatile memory, such as an electrically erasable programmable read-only memory (EEPROM). The storage 21 stores measurement data acquired by the measurer 12 and image projection data and obscure image projection data generated by the image projection data generator 22. The storage 21 also stores, for example, each threshold used by a measurement data determination unit 24 to determine precision, and computer-aided design (CAD) data of the work 18.

From measurement data acquired by the measurer 12, the image projection data generator 22 of the controller 17 generates image projection data to be projected onto the outer surface of the work 18 and stores the generated image projection data in the storage 21. As necessary, the image projection data generator 22 generates image projection data from measurement data stored in the storage 21. The image projection data generator 22 also generates obscure image projection data and stores it in the storage 21. The obscure image projection data is constituted by a region of the image projection data determined to be obscure by the measurement data determination unit 24.

The image projection controller 23 of the controller 17 controls the storage 21 and the image projector 13 and causes the image projector 13 to project the image projection data and the obscure image projection data generated by the image projection data generator 22 onto the outer surface of the work 18. The image projection controller 23 adjusts the angle of view and the projection direction of the cameras 13A and 13B (see FIG. 7) of the image projector 13, so that the image projection data and the obscure image projection data that substantially coincide with a projection region R of the work 18 (see FIG. 6) are projected onto the outer surface of the work 18.

The image projection data generator 22 generates image projection data, as necessary, while measurement data is being acquired by the measurer 12. This allows the image projection controller 23 to cause the image projector 13 to project the image projection data onto the work 18 while the work 18 is being measured by the measurer 12.

The measurement data determination unit 24 of the controller 17 compares image projection data with CAD data of the work 18 stored in the storage 21 and determines a region where measurement data is not acquired with good precision. As described above, the image projection data generator 22 also generates obscure image projection data constituted by a region of image projection data determined to be obscure by the measurement data determination unit 24. While described in detail below, the image projection controller 23 causes the image projector 13 to project the obscure image projection data onto the work 18, so that the operator 19 can clearly recognize a region where measurement data is not acquired with good precision.

As illustrated in FIG. 3, in step S10, the operator 19 operates an operation unit of the personal computer, which serves as the controller 17, and stores CAD data of the work 18 to be measured in the storage 21. Then, while checking the CAD data displayed on the display of the personal computer, the operator 19 performs a coordinate setting operation of the measurer 12 using the CAD data to complete preparation for the measurement. The coordinate setting operation allows the image projection data to be projected in such a way that it substantially coincides with the measurement region of the work 18.

For example, FIG. 4 illustrates a measuring operation performed on a vehicle's door component 18A, which is the work 18 to be measured. In this case, the operator 19 secures the door component 18A onto a work table 31 and stores CAD data of the door component 18A in the storage 21. Then, while looking at the CAD data of the door component 18A displayed on the display, the operator 19 performs the coordinate setting operation by illuminating the upper surface of the door component 18A with the line laser L for measurement (see FIG. 6) from the measurer 12. A finely dotted region 32 represents the line laser L.

In step S11, the operator 19 determines the sequence of measurement on the work 18. For example, the operator 19 moves the line laser L emitted from the laser emitter 12A of the measurer 12, from one end toward the other end of the measurement region, to acquire measurement data of the work 18 for each line laser L and stores the acquired measurement data in the storage 21.

For example, to measure the upper surface of the door component 18A as illustrated in FIG. 4, the operator 19 moves the line laser L from one end to the other end of the door component 18A in the longitudinal direction to acquire the measurement data. For example, while operating the main body 11 with the grip 14 in such a way that the upper surface of the door component 18A is substantially parallel to the front surface 11A of the main body 11, the operator 19 illuminates the upper surface of the door component 18A with the line laser L across the short side.

In step S12, the image projection data generator 22 generates image projection data from the measurement data acquired by the measurer 12 and stores the generated image projection data in the storage 21.

As an exemplary method of generating image projection data, the present embodiment adopts the following method. First, the image projection data generator 22 transforms coordinate data of measurement data of the work 18 into a world coordinate system (world matrix). Next, the image projection data generator 22 transforms the world coordinate system (world matrix) into a view coordinate system (view matrix), and then transforms the view coordinate system (view matrix) into a projection coordinate system. Last, the image projection data generator 22 transforms the projection coordinate system into a screen coordinate system to generate image projection data.

In step S13, the image projection controller 23 controls the storage 21 and the image projector 13, calls the image projection data from the storage 21, and outputs the image projection data to the image projector 13. The image projector 13 projects the received image projection data onto the outer surface of the work 18. Before the projection, the image projection controller 23 identifies the projection region R (see FIG. 6) of the work 18 onto which an image representing the image projection data is to be projected. The image projection controller 23 then adjusts the angle of view and the projection direction of the cameras 13A and 13B (see FIG. 7) of the image projector 13, so that the image projection data that substantially coincides with the measurement region of the work 18 is projected by the image projector 13.

Referring to FIG. 4, a diagonally shaded region 33 represents the projection region R of the image projection data. The image projector 13 projects the image projection data onto a region of the upper surface of the door component 18A where measurement has been completed by the measurer 12. The image projection controller 23 generates image projection data of the region defined in the direction of measurement and causes the image projector 13 to project the generated image projection data onto the upper surface of the door component 18A. The image projection controller 23 repeats the generation of image projection data and causes the image projector 13 to project the generated image projection data onto the upper surface of the door component 18A while following the line laser L emitted from the laser emitter 12A (see FIG. 6) of the measurer 12.

In step S14, while performing the measuring operation on the work 18 using the measurer 12, the operator 19 checks the image projection data projected onto the outer surface of the work 18 and determines whether the measurement data is acquired with good precision.

For example, the image projector 13, which is a projector device as described above, projects the image projection data onto the upper surface of the door component 18A using a projection mapping technique. As illustrated in FIG. 4, the upper surface of the door component 18A is not a simple flat surface and has, for example, protrusions. Depending on the angle of the front surface 11A of the main body 11 with respect to the upper surface of the door component 18A, the presence of the protrusions creates shaded regions which are not properly illuminated with the line laser L and where measurement data cannot be acquired with good precision. Depending on how the door component 18A is illuminated and how its material is plated, even a flat surface of the door component 18A has some regions which are not properly illuminated with the line laser L and where measurement data cannot be acquired with good precision.

FIG. 5 illustrates image projection data projected onto an outer surface of the work 18 (which though is not the upper surface of the door component 18A). For example, a region marked with a circle 34 is a region where measurement data is not acquired with good precision. The image projection data is projected, for example, in blue onto a region where measurement data is acquired with good precision. As illustrated, the image projection data is superimposed on the outer surface of the work 18. On the other hand, image projection data is not generated for a region where measurement data is not acquired with good precision, and therefore, image projection data is not projected in blue onto this region. As a result, the outer surface of the work 18 is exposed in the region where measurement data is not acquired with good precision. That is, the image projection data is partially obscured and projected in blue in a patchy manner. This enables the operator 19 to determine the precision of the measurement data while checking how the image projection data is projected.

In step S14, the operator 19 checks the image projection data projected onto the upper surface of the work 18. If the operator 19 determines that there is a region where measurement data is not acquired with good precision (NO in step S14), the process proceeds to step S15, where, without ending the measuring operation on the work 18, the operator 19 remeasures the region for which it has been determined that measurement data is not acquired with good precision. The measurement data acquired by the remeasurement is stored in the storage 21.

The process then returns to step S12, where, as described above, the image projection data generator 22 generates image projection data from the measurement data acquired by the remeasurement and stores the generated image projection data in the storage 21. In step S13, the image projection controller 23 causes the image projector 13 to project the image projection data obtained through the remeasurement onto the outer surface of the work 18. Then, in step S14, the operator 19 checks the projected image projection data and determines whether measurement data is acquired with good precision in the remeasured region. The image projection data generator 22 may combine the measurement data acquired by the remeasurement with the measurement data acquired by the previous measurement to generate image projection data.

For example, while adjusting the angle of the front surface 11A of the main body 11 with respect to the upper surface of the door component 18A using the grip 14, the operator 19 measures the region for which it has been determined that the measurement data is not acquired with good precision. For the measurement, the operator 19 illuminates the region with the line laser L, for example, in a direction different from the direction of measurement in the previous measurement. Then, as described above, the operator 19 checks the image projection data projected onto the upper surface of the door component 18A subjected to the remeasurement and determines the precision of measurement data.

The operator 19 checks the image projection data projected onto the upper surface of the work 18, and if determining that all measurement data are acquired with good precision (YES in step S14), the process proceeds to step S16, where the operator 19 ends the measuring operation on the upper surface of the work 18. The operator 19 then performs the same measuring operation as above on unmeasured sides of the work 18 to acquire measurement data of the entire work 18.

If the operator 19 determines that the upper surface of the door component 18A has a region where measurement data is not acquired with good precision, the operator 19 repeats the remeasuring operation involving steps S15, S12, and S13 until no such region is found.

FIG. 6 to FIG. 9 schematically illustrate a measuring operation performed on the work 18 by the image projection measuring apparatus 10 according to the present embodiment.

Figure 6:
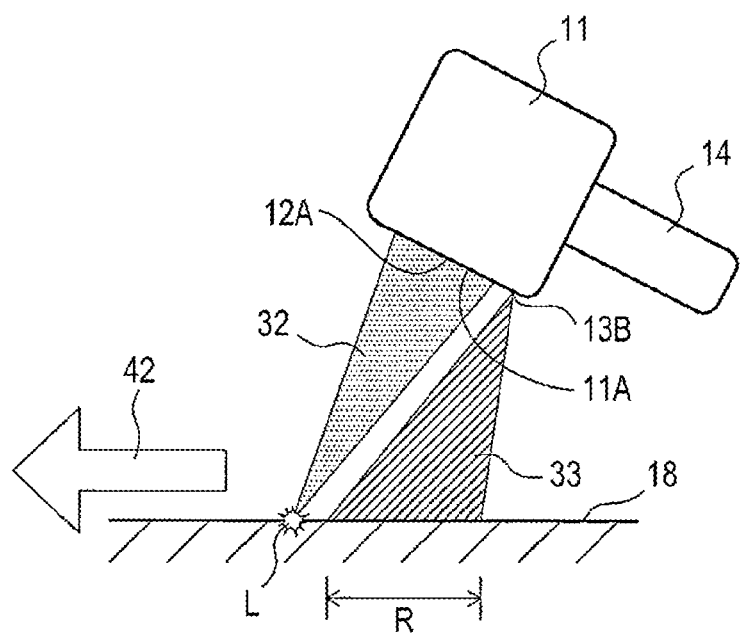
FIG. 6 schematically illustrates how the image projection measuring apparatus according to the embodiment of the disclosure performs measurement.

FIG. 6 illustrates a measuring operation performed when the laser emitter 12A of the measurer 12 is disposed in substantially the center of the front surface 11A of the main body 11 and one camera 13B of the image projector 13 is disposed below the laser emitter 12A in the vicinity of the lower end of the front surface 11A of the main body 11. An arrow 41 indicates a measuring direction in which the measuring operation on the work 18 proceeds. By holding the grip 14, for example, the operator 19 performs the measuring operation while tilting the main body 11 forward.

The finely dotted region 32 represents the line laser L emitted from the laser emitter 12A of the measurer 12, and the diagonally shaded region 33 represents the projection region R of the image projection data projected from the camera 13B. As described above, since image projection data is generated from measurement data acquired by the measurer 12, the projection region R of the image projector 13 is located behind the line laser L in the measuring direction.

To allow the projection region R to be located behind the line laser L in the configuration with one camera 13B, the operator 19 cannot perform the measuring operation while stretching and contracting the arm to move the main body 11 back and forth. Accordingly, within the range of movement of the articulated arm 15 (see FIG. 1), the operator 19 moves around the work table 31 (see FIG. 4) to which the work 18 is secured. Then, while performing the measuring operation on the work 18, the operator 19 checks the projected image projection data to determine the precision of the measurement data.

Figure 7:
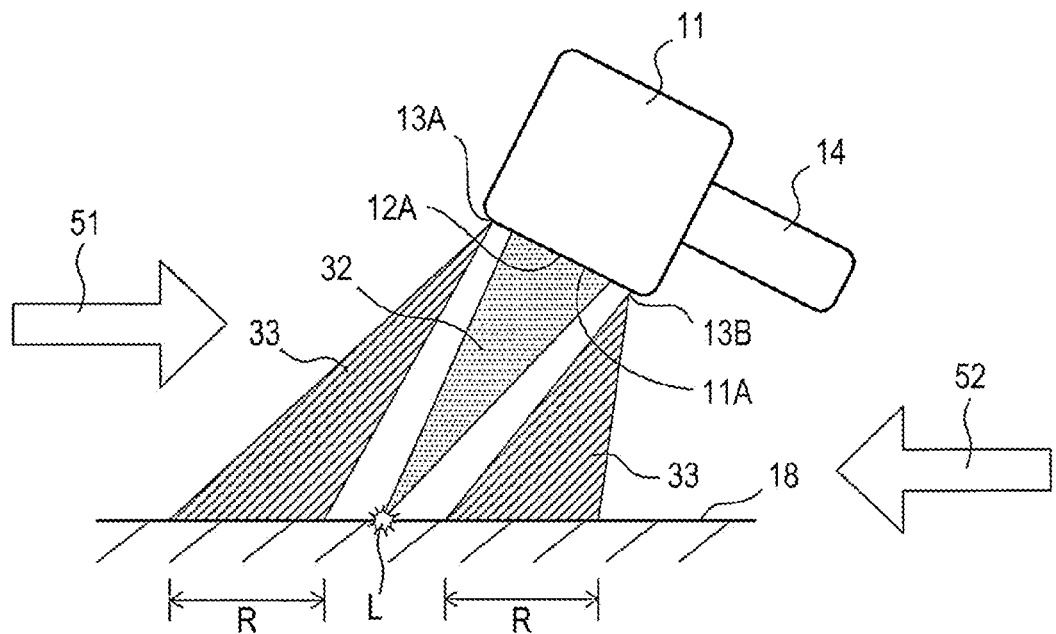
FIG. 7 schematically illustrates how the image projection measuring apparatus according to the embodiment of the disclosure performs measurement.

FIG. 7 illustrates a measuring operation performed when the laser emitter 12A of the measurer 12 is disposed in substantially the center of the front surface 11A of the main body 11 and two cameras 13A and 13B of the image projector 13 are disposed above and below the laser emitter 12A in the vicinity of the upper and lower ends of the front surface 11A of the main body 11. Arrows 51 and 52 each indicate a measuring direction in which a measuring operation on the work 18 proceeds. By holding the grip 14, for example, the operator 19 performs the measuring operation while tilting the main body 11 forward.

When the work 18 is measured in the direction toward the operator 19 as indicated by the arrow 51, image projection data is projected from the camera 13A of the image projector 13 disposed near the upper end of the main body 11. When the work 18 is measured in the direction away from the operator 19 as indicated by the arrow 52, image projection data is projected from the camera 13B of the image projector 13 disposed near the lower end of the main body 11.

In the configuration with two cameras 13A and 13B, the operator 19 stretches and contracts the arm at one position of the work table 31 having the work 18 secured thereto to move the main body 11 back and forth within the range of movement of the articulated arm 15. Thus, while performing the measuring operation on the work 18, the operator 19 checks the projected image projection data to determine the precision of the measurement data.

The configuration is not limited to the one described above, in which the two cameras 13A and 13B of the image projector 13 are disposed above and below the laser emitter 12A on the front surface 11A of the main body 11. For example, four cameras including two cameras on the right and left sides of the laser emitter 12A as well as the two cameras 13A and 13B described above may be disposed on the front surface 11A of the main body 11. In this case, by appropriately switching the camera used for projection, the operator 19 can perform a measuring operation while image projection data is being projected from all directions within the range of movement of the articulated arm 15, so that working efficiency is improved.

Figure 8:
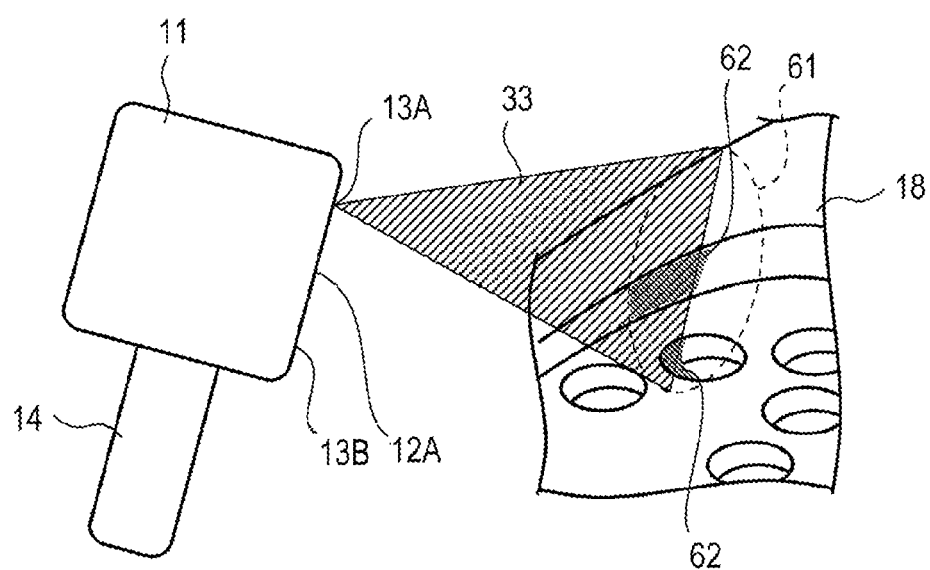
FIG. 8 schematically illustrates how the image projection measuring apparatus according to the embodiment of the disclosure performs measurement.
Figure 9:
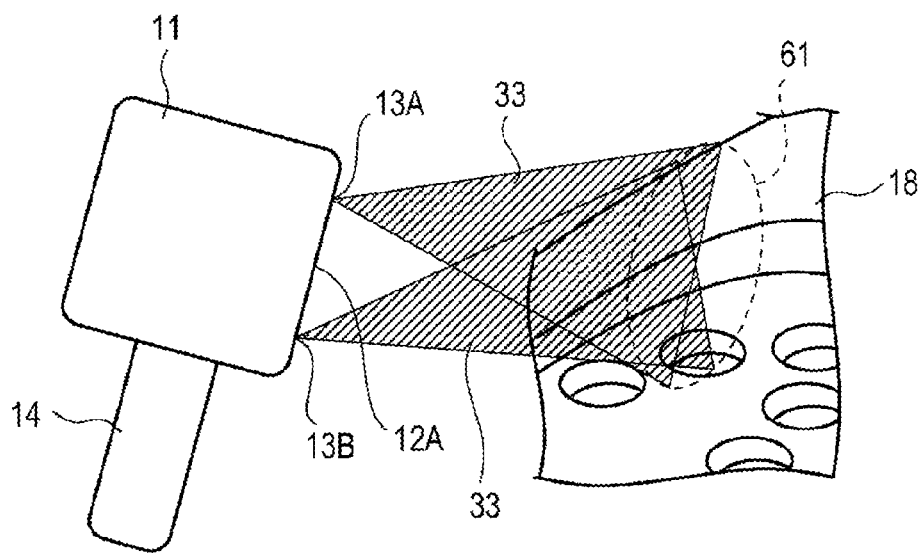
FIG. 9 schematically illustrates how the image projection measuring apparatus according to the embodiment of the disclosure performs measurement.

FIG. 8 and FIG. 9 schematically illustrate how image projection data is projected onto the outer surface of the work 18. FIG. 8 illustrates how image projection data is projected through one camera 13A near the upper end of the front surface 11A of the main body 11, and FIG. 9 illustrates how image projection data is projected through two cameras 13A and 13B near the upper and lower ends of the front surface 11A of the main body 11.

As illustrated in FIG. 8, a dotted circle 61 indicates the projection region R projected by the image projector 13. The outer surface of the work 18 to be measured has recessed portions. As illustrated, when image projection data is projected from the camera 13A near the upper end of the main body 11, areas indicated by dark regions 62 are in the shade of steps created by the recessed portions. Therefore, the image projection data may not be properly projected onto the outer surface of the work 18 and may be partially unclear.

As a result, even when measurement data is actually acquired with good precision, such an unclear region of the image projection data may be erroneously determined, by the operator 19, as a region where measurement data is not acquired with good precision.

In the configuration illustrated in FIG. 9, two cameras 13A and 13B of the image projector 13 are disposed near the upper and lower ends of the front surface 11A of the main body 11, with the laser emitter 12A of the measurer 12 in substantially the center of the front surface 11A interposed therebetween. As illustrated, the camera 13B on the lower side projects the same image projection data as the camera 13A on the upper side onto the projection region R indicated by the dotted circle 61. The image projection data is thus reliably projected even onto the areas (see the dark regions 62 in FIG. 8) that are in the shade of the steps.

As described above, the image projector 13 projects the image projection data onto the outer surface of the work 18 from at least two cameras 13A and 13B that are opposite, for example, in the up and down direction or in the right and left direction, with the laser emitter 12A interposed therebetween. This prevents the occurrence of an unclear region of image projection data caused by the outer shape of the work 18. The operator 19 can thus determine the precision of measurement data while looking at image projection data clearly projected onto the outer surface of the work 18 and can be prevented from making an erroneous determination such as that described above.

That is, as described with reference to FIG. 7, the laser emitter 12A of the measurer 12 is disposed in substantially the center of the front surface 11A of the main body 11, and a plurality of cameras 13A and 13B of the image projector 13 are disposed around the laser emitter 12A. Then, by projecting image projection data using at least two cameras 13A and 13B disposed front and back in the measuring direction, it is possible to avoid creation of blind spots, such as those created during projection with one camera. The image projection data is thus clearly projected onto the outer surface of the work 18.

In the present embodiment, the image projection controller 23 causes the image projector 13 to project image projection data onto the outer surface of the work 18. The operator 19 checks the projected image projection data, determines a region where measurement data is not acquired with good precision, and performs a remeasurement on the region. However, the disclosure is not limited to this.

As described with reference to FIG. 2, the measurement data determination unit 24 of the controller 17 determines precision of the measurement data acquired by the measurer 12. The measurement data determination unit 24 compares the image projection data generated by the image projection data generator 22 with CAD data of the work 18 stored in the storage 21. For example, image projection data is not generated for a region where measurement data is not acquired with good precision, and the resulting image projection data is patchy.

Accordingly, a threshold for density of image data in a predetermined area is set in advance. The measurement data determination unit 24 selects a patchy region with reference to CAD data, makes a determination for the region using the threshold, and determines a region where measurement data is not acquired with good precision. From image projection data, the image projection data generator 22 also generates obscure image projection data constituted by a region determined to be obscure by the measurement data determination unit 24.

In step S13 described with reference to FIG. 3, the image projection controller 23 controls the storage 21 and the image projector 13, calls obscure image projection data from the storage 21, and outputs the obscure image projection data to the image projector 13. The image projector 13 projects the received obscure image projection data onto the outer surface of the work 18.

In step S14 described with reference to FIG. 3, while performing a measuring operation on the work 18 using the measurer 12, the operator 19 can determine, if obscure image projection data is projected onto the outer surface of the work 18, that a region onto which the obscure image projection data has been projected is a region where measurement data is not acquired with good precision. In this case, the measurement data determination unit 24 mechanically determines the precision of measurement data on the basis of the threshold set in advance. This means that the determination of precision of measurement data is made consistently without being influenced, for example, by the experience and skill of the operator, and uniform precision of measurement data is achieved.

Other than projecting the obscure image projection data onto a region to be determined as described above, the obscure region may be highlighted with a red circle and superimposed on the entire image projection data being projected, so as to alert the operator 19. Various other changes can be made without departing from the scope of the disclosure.

In the image projection measuring apparatus according to the aspect of the disclosure, image projection data generated from measurement data of the work acquired by the measurer is projected by the image projector onto the outer surface of the work. From the image projection data projected onto the outer surface of the work, the operator can determine the precision of the measurement data.

With the image projection measuring apparatus according to the aspect of the disclosure, the operator can check the image projection data projected onto the work and determine the precision of the measurement data while performing a measuring operation on the work. Upon determining that there is a region where the measurement data is obscure, the operator can immediately start remeasurement of the region. This significantly improves working efficiency.

In the image projection measuring apparatus according to the aspect of the disclosure, the image projection data may be projected onto a region of the work substantially coinciding with a region where the measurement data is acquired. The operator can thus immediately identify a region where measurement has not been performed with good precision and can perform a remeasuring operation on the region.

In the image projection measuring apparatus according to the aspect of the disclosure, a plurality of cameras of the image projector may be disposed around the laser emitter of the measurer. This significantly reduces areas that are likely to become blind spots during projection. The operator can thus determine the precision of measurement data while looking at image projection data clearly projected onto the outer surface of the work.

In the image projection measuring apparatus according to the aspect of the disclosure, the measurement data determination unit may determine the precision of the measurement data using the image projection data. The determination of precision of measurement data can thus be made consistently without being influenced, for example, by the experience and skill of the operator.

The controller 17 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 17 including the storage 21, the image projection data generator 22, the image projection controller 23, and the measurement data determination unit 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An image projection measuring apparatus comprising:
    a measurer configured to measure a shape of a work by illuminating an outer surface of the work with a line laser from a laser emitter;
    a storage configured to store measurement data acquired by the measurer;
    an image projection data generator configured to generate image projection data from the measurement data;
    an image projector configured to project the image projection data from a camera; and
    an image projection controller configured to cause the image projector to project the image projection data onto the outer surface of the work,
    wherein the image projector sequentially projects the image projection data corresponding to a previous measurement position onto that measurement position while the line laser is moving to a next measurement position.

2. The image projection measuring apparatus according to claim 1, wherein the image projection controller is configured to cause the image projector to project, while the line laser is moved with respect to the outer surface of the work in a measuring direction and the measurer acquires the measurement data, the image projection data onto the outer surface of the work.

3. The image projection measuring apparatus according to claim 2, wherein the image projection controller is configured to cause the image projector to project the image projection data onto a projected region of the outer surface of the work, the projected region substantially with a measured region where the measurement data is acquired.

4. The image projection measuring apparatus according to claim 3, wherein
    the image projector comprises multiple cameras including the camera,
    the multiple cameras are configured to project the image projection data,
    the multiple cameras are disposed around the laser emitter of the measurer, and
    the image projection controller is configured to cause the image projection data to be projected onto the outer surface of the work using at least two cameras of the multiple cameras, the at least two cameras being located respectively ahead of the laser emitter and behind the laser emitter in such a manner that the laser emitter interposed between the at least two cameras in the measuring direction of the line laser.

5. The image projection measuring apparatus according to claim 4, further comprising a measurement data determination unit configured to determine precision of the measurement data from the image projection data, wherein
    the image projection data generator is configured to generate obscure image projection data by collecting ones of the image projection data that are determined to be obscure by the measurement data determination unit, and
    the image projection controller is configured to cause the image projector to project the obscure image projection data onto the outer surface of the work.

6. The image projection measuring apparatus according to claim 3, further comprising a measurement data determination unit configured to determine precision of the measurement data from the image projection data, wherein
    the image projection data generator is configured to generate obscure image projection data by collecting ones of the image projection data that are determined to be obscure by the measurement data determination unit, and
    the image projection controller is configured to cause the image projector to project the obscure image projection data onto the outer surface of the work.

7. The image projection measuring apparatus according to claim 2, further comprising a measurement data determination unit configured to determine precision of the measurement data from the image projection data, wherein
    the image projection data generator is configured to generate obscure image projection data by collecting ones of the image projection data that are determined to be obscure by the measurement data determination unit, and
    the image projection controller is configured to cause the image projector to project the obscure image projection data onto the outer surface of the work.

8. The image projection measuring apparatus according to claim 1, wherein the image projection controller is configured to cause the image projector to project the image projection data onto a projected region of the outer surface of the work, the projected region coinciding with a measured region where the measurement data is acquired.

9. The image projection measuring apparatus according to claim 8, wherein
the image projector comprises multiple cameras including the camera,
the multiple cameras are configured to project the image projection data,
the multiple cameras are disposed around the laser emitter of the measurer, and
the image projection controller is configured to cause the image projection data to be projected onto the outer surface of the work using at least two cameras of the multiple cameras, the at least two cameras being located respectively ahead of the laser emitter and behind the laser emitter in such a manner that the laser emitter interposed between the at least two cameras in the measuring direction of the line laser.

10. The image projection measuring apparatus according to claim 9, further comprising a measurement data determination unit configured to determine precision of the measurement data from the image projection data, wherein
the image projection data generator is configured to generate obscure image projection data by collecting ones of the image projection data that are determined to be obscure by the measurement data determination unit, and
the image projection controller is configured to cause the image projector to project the obscure image projection data onto the outer surface of the work.

11. The image projection measuring apparatus according to claim 8, further comprising a measurement data determination unit configured to determine precision of the measurement data from the image projection data, wherein
the image projection data generator is configured to generate obscure image projection data by collecting ones of the image projection data that are determined to be obscure by the measurement data determination unit, and
the image projection controller is configured to cause the image projector to project the obscure image projection data onto the outer surface of the work.

12. The image projection measuring apparatus according to claim 1, further comprising a measurement data determination unit configured to determine precision of the measurement data from the image projection data, wherein
the image projection data generator is configured to generate obscure image projection data by collecting ones of the image projection data that are determined to be obscure by the measurement data determination unit, and
the image projection controller is configured to cause the image projector to project the obscure image projection data onto the outer surface of the work.

13. The image projection measuring apparatus according to claim 1, wherein the storage stores computer-aided design (CAD) data of the work,
the image projection measuring apparatus further comprising a measurement data determination unit configured to:
compare the image projection data with computer-aided design (CAD) data of the work stored in the storage; and
determine a region where measurement data is not acquired based on a result of the comparing.

14. The image projection measuring apparatus according to claim 13, wherein the image projection data generator is configured to generate obscure image projection data based on a result of the determining the region, and
wherein the image projection controller is configured to cause the image projector to project the obscure image projection data onto the outer surface of the work.

15. The image projection measuring apparatus according to claim 1, wherein, after the image projection controller causes the image projector to project the image projection data and based on a user input, the image projection data generator generates second image projection data from remeasurement data.

16. The image projection measuring apparatus according to claim 15, wherein the second image projection data is combined with the image projection data for projection by the image projector.

17. The image projection measuring apparatus according to claim 1, wherein the image projector projects the image projection data from the camera while the work is being simultaneously measured by the measurer.

18. An image projection measuring apparatus comprising:
an image projector configured to project image projection data from a camera; and
circuitry configured to:
measure a shape of a work by illuminating an outer surface of the work with a line laser from a laser emitter,
acquire measurement data by the measuring the shape of the work,
generate the image projection data from the measurement data, and
cause the image projector to project the image projection data onto the outer surface of the work,
wherein the image projector sequentially projects the image projection data corresponding to a previous measurement position onto that measurement position while the line laser is moving to a next measurement position.

* * * * *